United States Patent
Turgeon

[15] 3,679,240
[45] July 25, 1972

[54] TUBULAR CIRCULAR GASKET TO SEAL AND REDUCE FORCE IN TRANSMISSION SYSTEM

[72] Inventor: Joseph A. Turgeon, Toronto, Ontario, Canada

[73] Assignee: I-T-E Circuit Breaker (Canada) Limited, Ontario, Canada

[22] Filed: April 14, 1970

[21] Appl. No.: 28,416

[52] U.S. Cl. ............................ 285/233, 285/344, 285/373
[51] Int. Cl. .................................................... F16l 21/06
[58] Field of Search ............... 285/136, 163, 233, 234, 302, 285/344, 373

[56] References Cited

UNITED STATES PATENTS

| 3,206,233 | 9/1965 | Turgeon | 285/233 |
|---|---|---|---|
| 2,467,911 | 4/1949 | Reilly | 285/302 |
| 2,872,218 | 2/1959 | Killian et al. | 285/344 X |
| 2,956,820 | 10/1960 | de Cenzo | 285/233 X |

FOREIGN PATENTS OR APPLICATIONS

| 549 | 1857 | Great Britain | 285/163 |
| 545,933 | 8/1922 | France | 285/344 |

Primary Examiner—David J. Williamowsky
Assistant Examiner—David H. Corbin
Attorney—Ostrolenk, Faber, Gerb & Soffen

[57] ABSTRACT

A tubular gasket is employed in a manner to maintain a watertight joint between adjacent isolated phase bus housings and their associated clamp-on cover and, also, to reduce the magnitude of frictional forces produced during movement of one housing relative to the cover to a level sufficient to protect against buckling of the respective components.

3 Claims, 15 Drawing Figures

PATENTED JUL 25 1972 3,679,240

INVENTOR
JOSEPH A. TURGEON

BY
Ostrolenk, Faber, Gerb & Soffer
ATTORNEYS

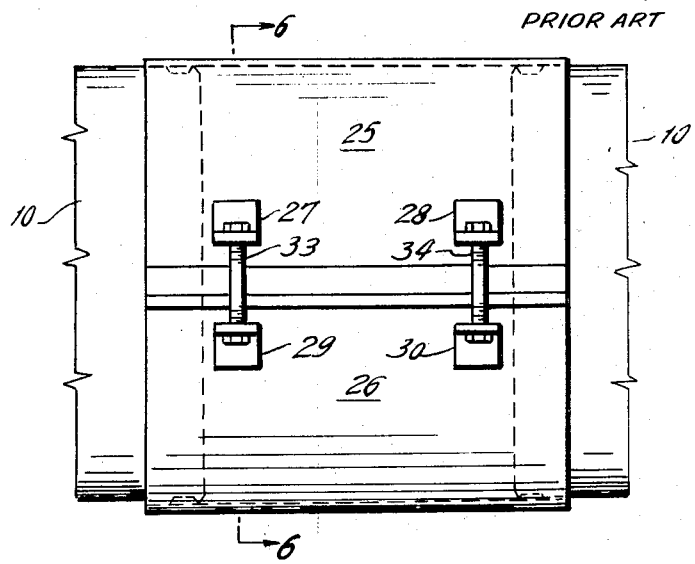
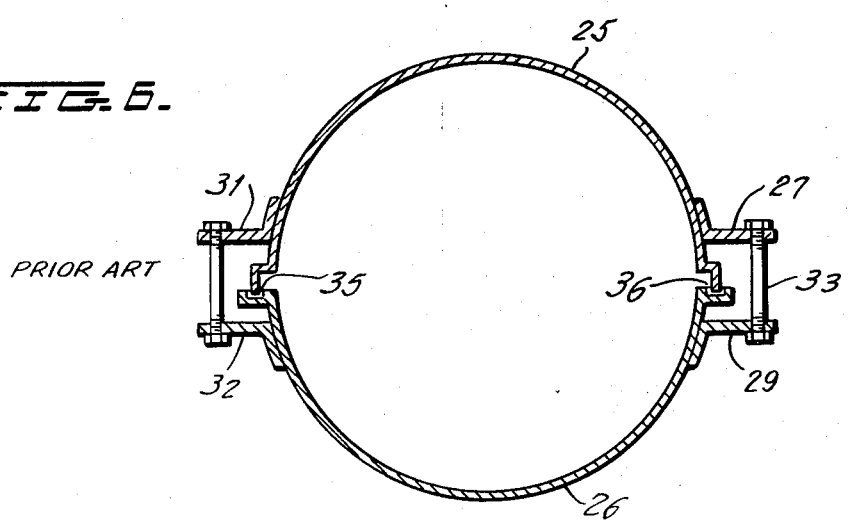
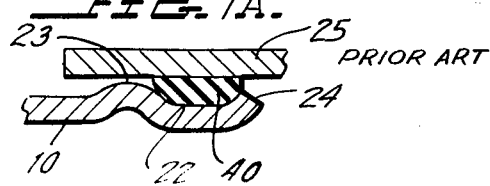
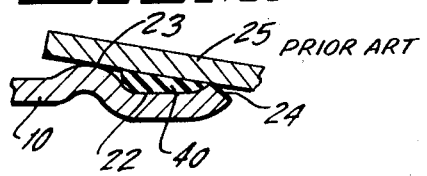
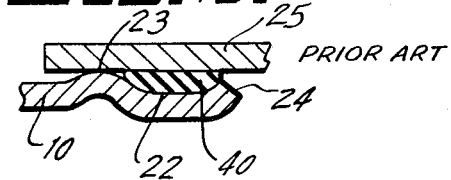
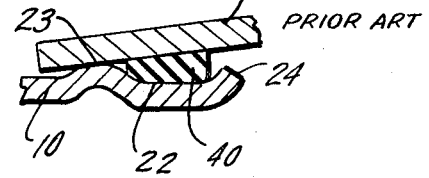

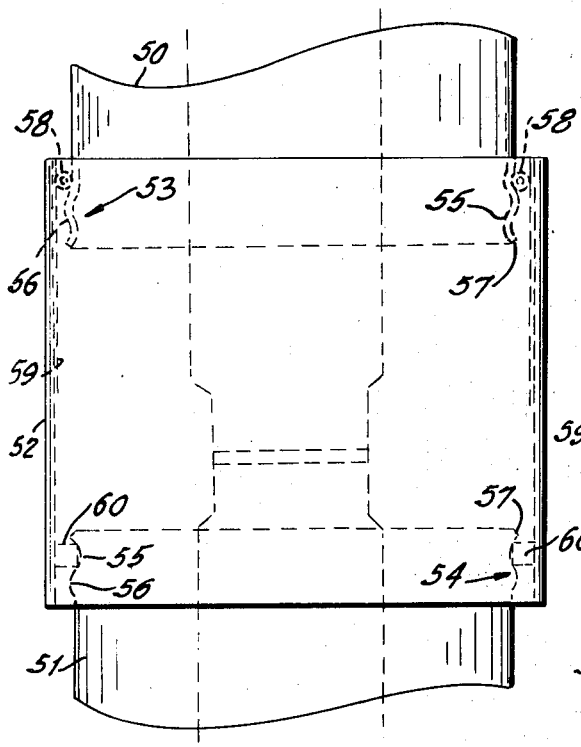
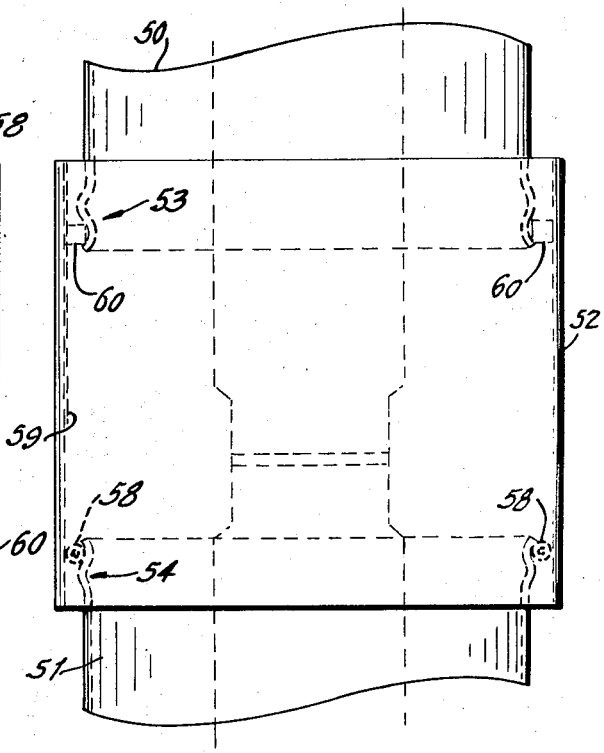
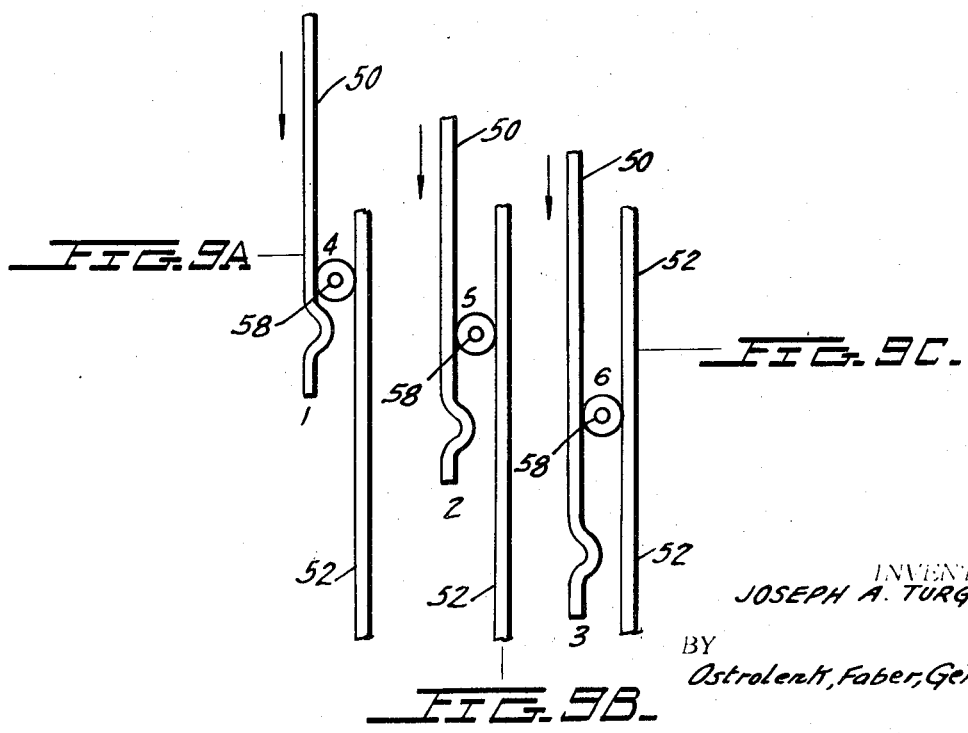

TUBULAR CIRCULAR GASKET TO SEAL AND REDUCE FORCE IN TRANSMISSION SYSTEM

This invention relates to groove arrangements for the end of an isolated phase bus housing and, more specifically, relates to a tubular gasket construction which permits water-tight connection between two adjacent isolated phase bus housings, although there is misalignment between the two housings. As will subsequently become clear, this invention constitutes an improvement over that described in my U.S. Pat. No. 3,206,233, issued Sept. 14, 1965 entitled, "ROLLED GROOVE FOR ISOLATED PHASE BUS HOUSING GASKET", and assigned to the same assignee as is this application.

As is described in my U.S. Pat. No. 3,206,233 isolated phase bus systems in which a bus conductor is surrounded by a metallic housing are well known. The bus housings are made in sections of predetermined lengths which are joined together, and for purposes of inspection, predetermined lengths of the bus housing are formed with clamp-on covers which can be removed to expose the bus and the insulators which support it with respect to the housing. Since the housing must be water-tight, an efficient gasket joint between the clamp-on covers and the bus housing portions is necessary.

In my aforesaid patent, I describe a novel rolled groove arrangement and annular gasket construction which cooperate in such a manner that the clamp-on covers form an effective water-tight seal to the housings, even though there is a substantial misalignment between the ends of the adjacent housings sealed by the covers. More specifically, I describe a rolled section in the ends of the bus housing, including an annular groove for receiving the annular gasket and which terminates with an upwardly extending tip having a smaller radius then does the outer portion of the groove. Clamp-on covers engage the rolled groove only at its higher, or bead, portion, with the annular gasket being interposed between the end of the bus and this raised bead portion. Because the end of the bus is one a smaller radius than is the raised bead, misalignment between adjacent housing portions is permissible, but the bus covers are applied to form an effective water-tight joint, even though the axes of the adjacent housing portions are misaligned.

The present invention constitutes an improvement over that described in my U.S. Pat. No. 3,206,233 in that it substantially reduces frictional forces in arrangements where large relative movement is anticipated between a bus housing and its clamp-on cover. Such movement may be of the order of five inches, and can occur for example, in hydroelectric power installations where the bus housings run vertically from the generating installation at the base of a hill or waterfall to the distributing installation at the top of the hill. Since the generating installation is anchored in solid rock and the distributing installation is permitted to shift and settle with the ground, very large frictional forces are created between adjacent bus units. These forces can cause buckling of the various components of the transmission system and in any case, are sufficiently large to destroy the water-tight joint between the clamp-on cover and its associated bus housings.

As will become clear hereinafter, reduction of these frictional forces is achieved according to the present invention by using a tubular gasket to provide the water-tight seal, rather than the annular gasket employed in my U.S. Pat. No. 3,206,233. As described in that patent, the annular gasket is particularly useful where bus housings run horizontally, i.e. where frictional forces are less.

These and other advantages of the present invention will become apparent from the following description when taken in connection with the drawings, in which:

FIG. 1 illustrates a length of isolated phase bus housings having the rolled groove of my U.S. Pat. No. 3,206,233 at either of its ends;

FIG. 5 is a side plan view of the adjacent ends of two spaced housings of the type of FIG. 1, with a clamp-on cover connected to enclose the space defined by the adjacent bus housings;

FIG. 6 is a side cross-sectional through the covers of FIG. 5 taken along the lines 6—6 of FIG. 5;

FIG. 7A is an enlarged cross-sectional view which illustrates the manner in which the end of the cover of FIG. 5 is received by the rolled groove of U.S. Pat. No. 3,206,233, and shows an annular gasket in a noncompressed construction;

FIG. 7B corresponds to FIG. 7A, but shows the annular gasket compressed, with a bus cover in an aligned condition;

FIGS. 7C and 7D similarly show the gasket compressed but under conditions of bus cover misalignment;

FIG. 8 is an enlarged cross-sectional view which illustrates the manner in which the ends of the cover of FIG. 5 is received by the rolled groove of U.S. Pat. No. 3,206,233, and shows a tubular gasket in the non-compressed construction for an arrangement where relative movement between a bus housing and its clamp-on cover exceeds the width of the rolled groove;

FIG. 9A–9C show rolling action of the tubular gasket of FIG. 8 for three positions of relative movement between the bus housing and the clamp-on cover; and FIG. 10 is an enlarged cross-sectional view which illustrates the manner in which the end of the cover of FIG. 5 is received by the rolled groove of my U.S. Pat. No. 3,206,233, and shows the tubular gasket in the non-compressed construction for an arrangement where the relative movement between a bus housing and its clamp-on cover is of the order of the width of the rolled groove.

Figure 1:
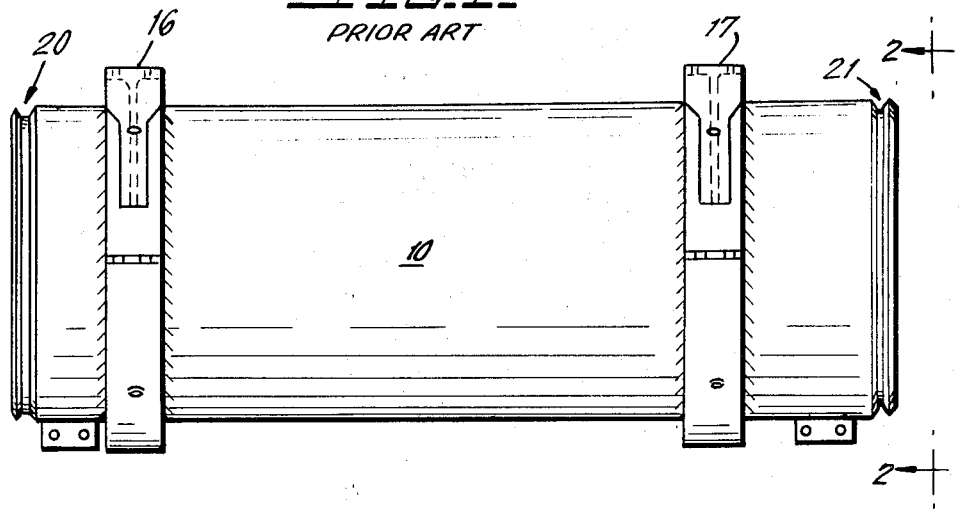
Figure 2:
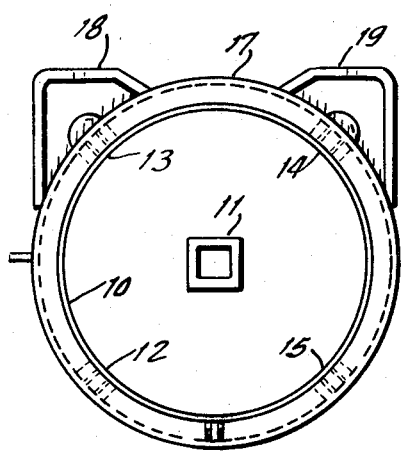
FIG. 2 is a side view of the housing of FIG. 1.

Referring first to FIGS. 1 and 2, I have illustrated a housing section 10 which is to enclose a bus such as the bus 11 of FIG. 2 which extends centrally of the housing. As is usual in the prior art, the bus 11 will be supported from the housing 10 by insulator means (not shown) which are secured at locations 12, 13, 14 and 15 of bus support rings 16 and 17 which are welded to housing 10. The bus support rings 16 and 17 are further provided with mounting brackets 18 and 19, as shown in FIG. 2, for supporting the bus from some support structure in the usual manner.

In accordance with the invention in my U.S. Pat. No. 3,206,233, the ends 20 and 21 of housing 10 are provided with a rolled groove for permitting connection to a cover member in a manner to define a water-tight joint. The bus housing 10 can, for example, have a length of the order of 10 feet and a diameter of 20 inches. When housing portions similar to housing portion 10 are mounted to support structure, it is understandable that the axis of the various adjacent housings may be misaligned. However, the cover arrangement which connects the two adjacent housings must still form a water-tight seal, even though the axis of the cover will be at an angle to the axis of the adjacent housings.

Figure 3:
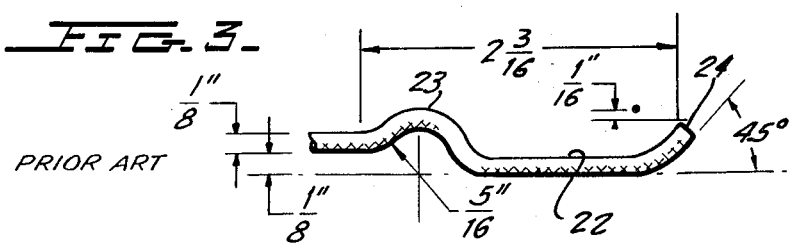
FIG. 3 is a detailed cross-sectional view through the rolled groove at one end of the housing of FIG. 1.
Figure 4:
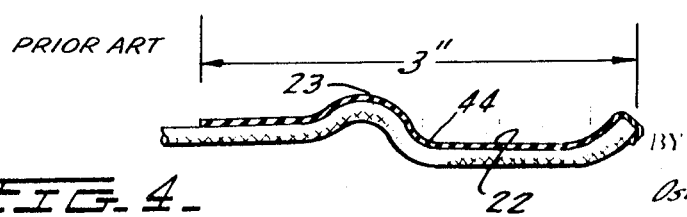
FIG. 4 shows the view of FIG. 3, and additionally illustrates a layer of insulation placed on the outer grooved surface.

In accordance with the invention of U.S. Pat. No. 3,206,233, the end portions 20 and 21 are formed to a cross-section shown in FIG. 3 by rolling to define an annular groove portion 22 which is positioned between a raised bead section 23 and a raised tip section 24. For purposes of illustration, the various dimensions of a typical end section are shown in FIG. 3, it being important to note that the bead portion 23 has a radius which is one-sixteenth of an inch greater than the radius of tip 24. (note drawing dimensions) The groove of FIG. 3 is rolled into the housing ends of the housing of FIG. 1 after the housing is formed and, thereafter, the rolled groove portion is covered with an insulating layer 44 which could be a tape or a layer of insulating paint so that the cover to be ultimately connected to this portion will be electrically insulated from housing 10.

In FIGS. 5 and 6 I have illustrated two housing portions 10 which are positioned in spaced relationship with respect to one another, and are to receive a clamp-on cover. Thus, in FIG. 5, a clamp-on cover comprised of cover halves 25 and 26 are to be clamped over the adjacent ends of housing sections 10. While the clamping arrangeemnt for clamping cover halves 25 and 26 together may be of any desired type, one typical example is specifically shown in FIGS. 5 and 6 where the covers are provided with extending angles, such as angles 27 and 28 of cover half 25 and angles 29 and 30 of cover half 26. Similar pairs of cover angles are provided on the other side of cover halves 25 and 26, and are shown in FIG. 6 for the case of angles 31 and 32 of cover halves 25 and 26, respectively.

The extending angles then receive bolt means shown as bolts means 33 and 34 in FIGS. 5 and 6 which operate to draw the cover toward one another. An axial gasket means is provided by forming an extending flange portion in cover half 26 which, as shown in FIG. 6, has cork-type gaskets 35 and 36 therein which receive extending flanges of cover half 25 as shown. Thus, when cover halves 25 and 26 are assembled, a longitudinal seal is formed along the points at which the cover halves engage one another.

In accordance with the invention of my previously issued U.S. Pat. No. 3,206,233, a water-tight seal is formed between the periphery of the cover formed of halves 25 and 26 and either end of housing portions 10. Thus, as shown therein and as repeated here in FIG. 7A, an annular gasket 40 is positioned within annular groove 22, which gasket is at least higher than the maximum height of bead 23. This gasket is compressed (FIG. 7B) when cover halves 25 and 26 are connected together, and by continuing to tighten cover halves 25 and 26 to one another, the inner surface of the ends of cover halves 25 and 26 will bear on the top surface of bead 23. Since the extending lip 24 at the end of housing 10 is below the level of bead 23, it will be apparent that the cover portions 25 and 26 can still be connected in sealing relationship of the end of cover 10, even though there is an axial misalignment between the cover and the housing (FIG. 7C and 7D).

Isolated phase busbars of the type herein generally described are oftentimes used to carry very high amperages, of the order of 1,000 amperes and upwards. Frequently, these amperages are carried at high voltages, of the order of 15 Kv. and up—for example, at hydroelectric power generating stations. In such environments, the isolated phase busbar carries power from the generating installation to the power distribution installation, which then distributes the power among the various transmission lines employed.

Normally, as described in U.S. Pat. No. 3,206,233, the isolated phase busbar runs horizontally a few hundred feet between the generating and distribution installations. However, in certain power generating stations and, in particular, in hydroelectric power stations, the generating installation is located at the base of a hill (e.g. at the bottom of a waterfall), while the distributing installation is located at the top of the hill (above the waterfall). There, the isolated phase busbar runs vertically, rather than horizontally.

Usually, shifting from a horizontal busbar run to a vertical run has little effect on axial shifting between adjacent busbar portions; little, if any, disturbance thus results to the water-tight seal between the clamp-on cover and the bus housing portions. However, considerable excavation of the terrain surrounding a hydroelectric power installation is frequently required for installing the generating and transmitting equipment and, perhaps, for strengthening and altering the hillside around and beneath the water fall. In construction of the power plant, the generating installation is usually anchored in solid rock at the base of the hill to prevent its shifting, whereas the distributing installation is located at the top of the hill, where it will typically shift and settle with the ground. While the annular gasket arrangement described in my U.S. Pat. No. 3,206,233 served to provide a water-tight seal in the horizontal-run environment described above, it has been found that in vertical-run instances where relatively large movement occurs due to ground level shifts, frictional forces can be created which tend to deteriorate the annular gasket over a period of time.

That is, whereas in the horizontal-run arrangement, misalignment between adjacent bus housings primarily occurs as a result of variations in ambient temperatures as the busbar naturally heats up and cools off when it is respectively transmitting and not transmitting power, in the vertical-run construction, the misalignment additionally occurs as a result of ground movement. In such vertical-run environments as exist at hydroelectric power stations, it is not unusual to find shifts of five inches or more between the clamp-on cover and the associated bus housings. Maintenance of a water-tight seal in this instance is sometimes difficult to achieve with my annular gasket construction.

In FIG. 8, two housing sections 50 and 51 are illustrated for arrangement in a vertical run environment where a large relative movement is anticipated between the housing 50 and the clamp-on cover 52. End portions 53 and 54 of housing sections 50 and 51 are illustrated as being formed to a cross-section by rolling to define an annular groove portion 55 which is positioned between a raised bead section 56 and a raised tip section 57. Such groove portion 55 will be understood as being similar to the annular groove 22 of FIGS. 3–4 and 7A–7D, and where large relative movement is anticipated, the annular gasket 40 (as described with respect to those figures) will be understood as being replaced by a tubular gasket 58, for example of silicone rubber.

In the description that follows, it will be assumed that the relative movement results from ground shifts is between the bottom of the housing section 50 and the clamp-on cover 52. Where large movement is also expected between the top of housing section 51 and the clamp-on cover 52, a similar tubular gasket 58 will be positioned to reduce frictional force between that bus section 51 and the clamp-on cover 52. For purposes of illustration however, an annular gasket 60 similar to that described in my U.S. Pat. No. 3,206,233 is employed between the housing section 51 and the cover 52 to indicate that the movement therebetween is not too extensive. It will also be noted that, contradistinct to the description of FIGS. 1–7, the tubular gasket 58 is here located on the side of the annular groove 55 opposite that between the raised bead section 56 and the raised tip section 57. The diameter of the tubular gasket 58 is greater than the height of the raised portion to provide a positive water-tight seal in the presence of axial bead misalignment of the type herein described with respect to FIGS. 7A–7D.

FIGS. 9A–9C schematically illustrate three positions of the bus housing 50 and tubular gasket 58 during movement of the unit 50 with respect to the clamp-on cover 52. As will be readily apparent, movement of the bus housings 50 to position 1, 2 and 3 of FIGS. 9A–9C causes corresponding movement of tubular gasket 58 against which it presses to positions 4, 5 and 6 therein. The sliding friction that would be present if an annular gasket were employed in such an instance is replaced with this gasket configuration by a rolling friction, which greatly reduces the force and reaction on the cover 52 (thereby protecting it against buckling) while maintaining the required water-tight seal. Where there is little or no necessity to protect the gasket against deterioration caused by the relative movement of housing section 50 relative to the clamp-on cover 52, the annular gasket of my U.S. Pat. No. 3,206,233 may be used, with the arrangement then being essentially a vertical arrangement of that patent's horizontal-run section.

The configuration of FIG. 8 is one in which large relative movements are anticipated. The tubular gasket 58, by virtue of its placement on the side of the bead section 56 away from the tip section 57 permits rolling frictional forces to be developed along the expected length of movement. In some instances, however, the relative movement between the clamp-on cover 52 and either or both bus section may be less extensive than in the hydroelectric power station environment—for example, where relative movement may be only of the order of three-eighths of an inch. In such cases, the tubular gasket 58 may be positioned within the annular groove 55, between the raised bead section 56 and the upward tip section 57 (FIG. 10). In this instance, the rolling occurs within the groove 55 and, as before, is one in which the frictional forces present are of lower magnitude.

In both the embodiments of FIGS. 8 and 10, it will be seen that axial movement of one bus housing with respect to its clamp-on cover occurs through a rolling action whereby frictional forces are reduced, while the water-tight seal is maintained. Where mis-alignment of the housings occur, the compressive forces on the gasket employed continue the water-tight seal, as described in my aforesaid patent. In both this application and that patent, an insulating layer (44 in FIG. 4 herein and 59 in FIGS. 8 and 10) is used over the clamp-on cover to electrically insulate that cover from the bus housing section.

I claim:

1. An isolated phase bus having first and second cylindrical bus housings, each of which is adapted to have an end portion thereof enclosed by a cylindrical bus cover placed in overlapping relationship with respect to said end portions, and wherein it is desired that one of said bus sections remain fixed relative to the remaining bus section so as to control the movement of the cover sealing said sections;

said first and second cylindrical bus housings being in general axial alignment with each other and with said cylindrical bus cover;

said cylindrical bus cover being comprised of first and second semi-cylindrical half covers;

each of said end portions of said first and second cylindrical bus housings respectively having first and second raised portions extending around their periphery and first and second annular grooves terminating in first and second raised tip portions at the respective ends of said first and second cylindrical bus housings, with said first and second raised portions extending above their respective raised tip portions and with said first and second raised portions and said first and second annular grooves being rolled in said first and second cylindrical bus housings;

a tubular compressible gasket positioned at said end portion of said first cylindrical bus housing and extending above said first raised portion;

an annular compressible gasket having at least one flat surface and being positioned at said end portion of said second cylindrical bus housing and extending above said second raised portion;

clamping means on each of said cylindrical half covers, securing said half sections together and said cylindrical bus cover to the periphery of said raised portions to thereby compress said tubular compressible gasket and said annular compressible gasket, said flat surface engaging the interior surface of said bus cover;

the inner surface of said cylindrical bus cover forcibly bearing against said raised portions while permitting a predetermined amount of clearance with said tip portions, allowing relative axial misalignment between said cylindrical bus cover and said bus housings, with said cylindrical bus cover having a range of pivoted motion with respect to said first and second cylindrical bus housings while maintaining said gaskets in a compressed condition; and axially compressible gaskets, positioned between said first and second semi-cylindrical half covers cooperating with said tubular and annular compressible gaskets to render said isolated phase bus water-tight;

with said tubular gasket giving rise to rolling frictional forces between said clamp-on cover and said first cylindrical bus housing moving in a direction parallel to the common axis of said bus cover, while said annular compressible gasket prevents said cover from moving relative to the bus housing engaging said annular compressible gasket.

2. The isolated phase bus of claim 1 in which said tubular and annular gaskets are positioned respectively within said first and second annular grooves between said first and second raised portions thereof and said first and second raised tip portions.

3. The isolated phase bus of claim 1 in which said tubular gasket is positioned on said first cylindrical bus housing outside said first annular groove on the side of said raised portion remote from said raised tip portion in which said annular groove terminates;

and said annular gasket is positioned on said second cylindrical bus housing within said second annular groove between said second raised portion thereof and said second raised tip portion.

* * * * *